Dec. 13, 1932.  L. O. KELLEY  1,890,977
PENDULUM TYPE SCALE
Filed Sept. 26, 1930  5 Sheets-Sheet 1

INVENTOR
Leonard O. Kelley
BY Francis D. Hardesty
ATTORNEY

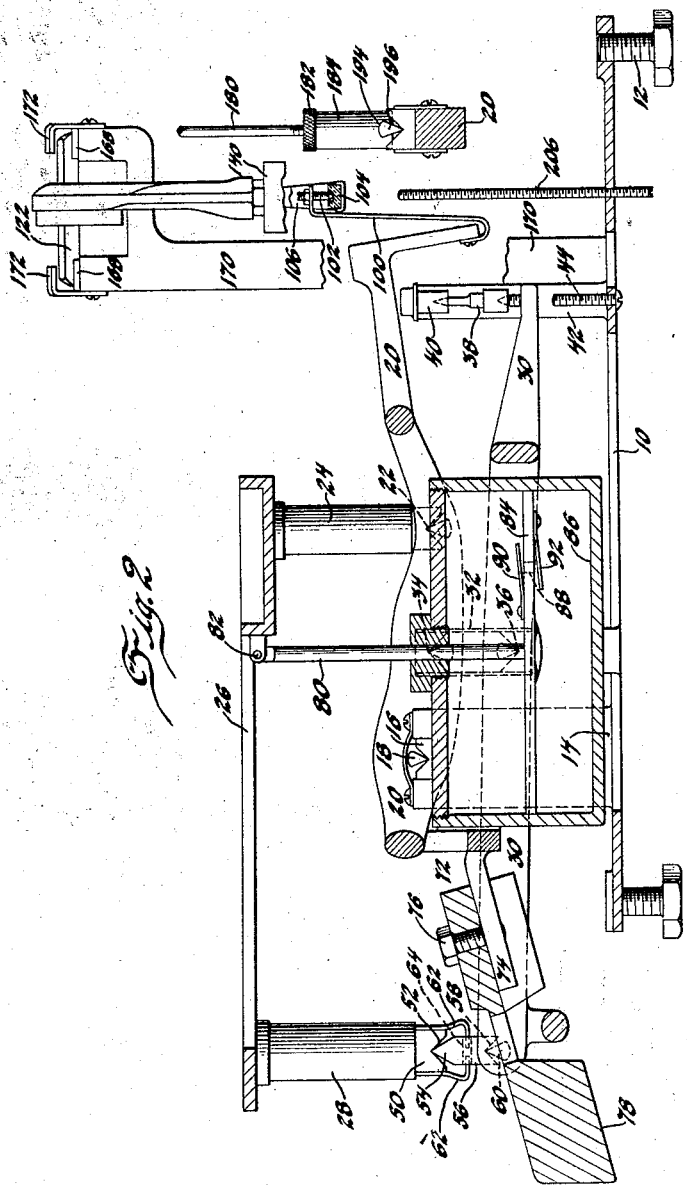

Dec. 13, 1932.　　　L. O. KELLEY　　　1,890,977
PENDULUM TYPE SCALE
Filed Sept. 26, 1930　　　5 Sheets-Sheet 3
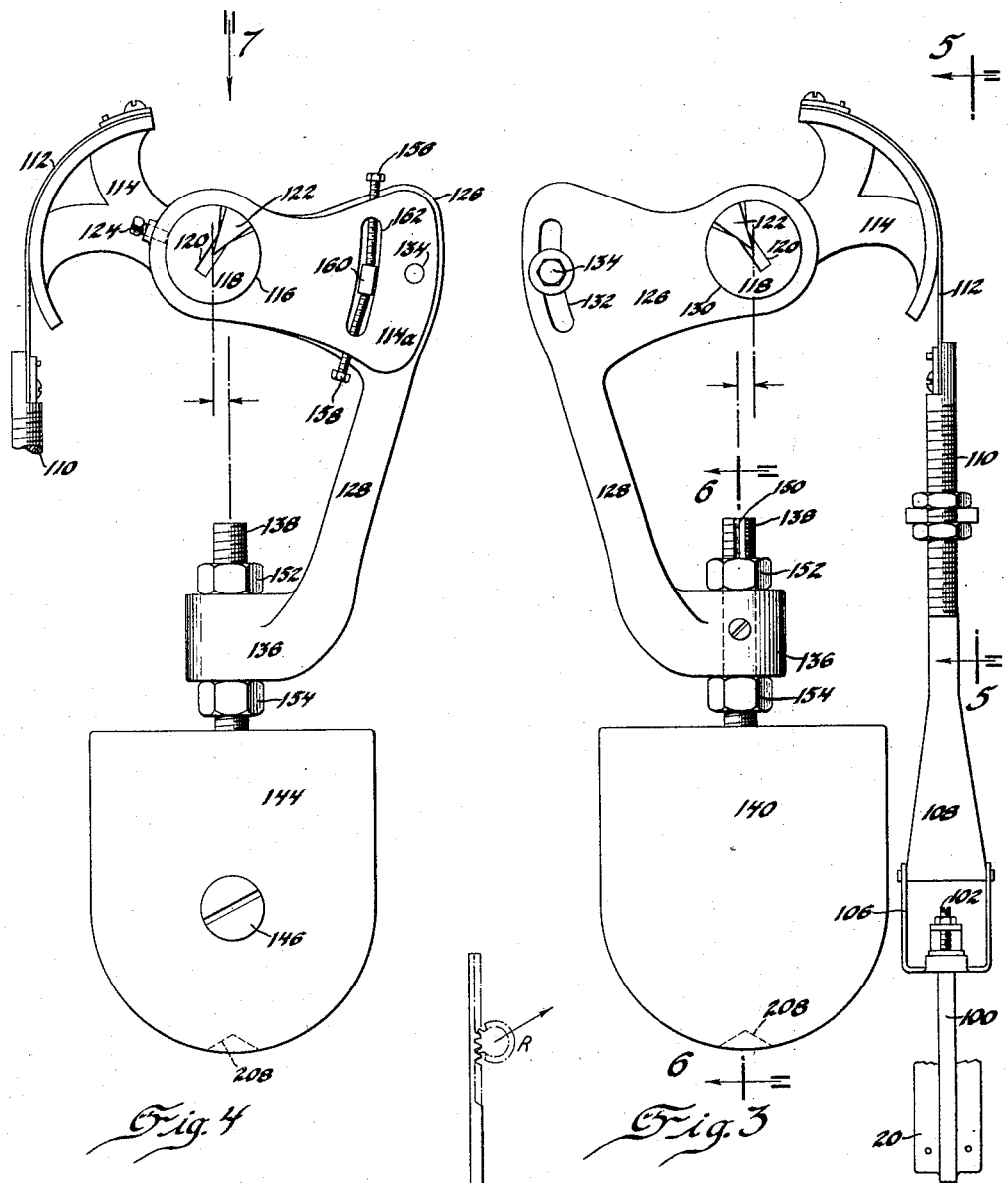
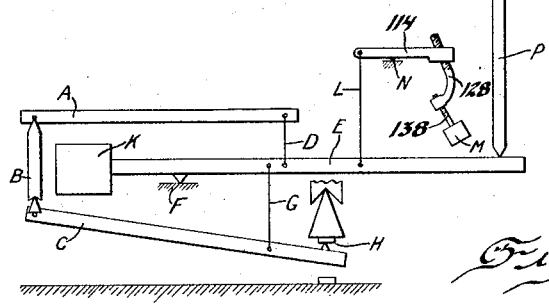
INVENTOR
Leonard O. Kelley
BY Francis D. Hardesty
ATTORNEY Dec. 13, 1932.   L. O. KELLEY   1,890,977
PENDULUM TYPE SCALE
Filed Sept. 26, 1930    5 Sheets-Sheet 5

INVENTOR
Leonard O. Kelley
BY
Francis D. Hardesty
ATTORNEY

Patented Dec. 13, 1932

1,890,977

UNITED STATES PATENT OFFICE

LEONARD O. KELLEY, OF DETROIT, MICHIGAN, ASSIGNOR TO THE STANDARD COMPUTING SCALE COMPANY, OF DETROIT, MICHIGAN, A CORPORATION OF MICHIGAN

PENDULUM TYPE SCALE

Application filed September 26, 1930. Serial No. 484,587.

This invention relates to platform scales and more particularly to novel details in the construction thereof.

An object of this invention is a platform scale having a pendulum counterweight connected to the main weighing lever, there being novel forms of adjustment for the pendulum counterweight.

A further object of the invention is a novel form of adjustment for scale rack rods.

A further object is a novel form of connection between a weighing lever and a connecting member, one that is adjustable and simply constructed.

A still further object is a novel form of connection between a main lever and a load counterweight, one that permits easy and accurate adjustment of the scale by replacing the load counterweight with others of different sizes.

A still further object is a scale having a sub-lever which is full floating, that is to say, nowhere does the sub-lever rest on fixed pivots.

A still further object is a novel form of dash pot.

A further object is a novel form of locking screw for lifting scale parts off their pivots during shipment, the locking screw being readily movable to permit the parts to assume their operative positions.

Still further objects will readily occur to those skilled in the art upon reference to the following description and the accompanying drawings in which Fig. 1 shows the operative parts of the scale, a portion of the casing and foundation being removed for purposes of clarity.

Fig. 2 is an enlarged view of the operating parts of Fig. 1, partly in section.

Fig. 3 is an enlarged view of the pendulum counterweight.

Fig. 4 is an obverse view of the same.

Fig. 10 is a diagrammatic view of the scale, parts being omitted for purposes of clarity.

As indicated in the diagrammatic view of Fig. 10, there is provided a load platform A which is pivotally connected by the means B to the sub-lever C and by the means D to the main lever E, the latter being mounted on the stationary pivot at F and being connected to the sub-lever by the means G, the base as shown, being provided with means H for restraining the movement of the sub-lever C. The main lever is provided with a load counterweight K at one end thereof and near its other end it is connected by means L to the pendulum counterweight M pivotally mounted on the stationary pivot N. Near the same end there is also provided a rack rod P and adapted to drop, as permitted by the main lever, so as to operate the indicator R.

It will be observed that the sub-lever is connected to the scale in such a manner as to include no fixed pivots and accordingly the sub-lever is rendered extremely responsive to variations in the load, thus providing an accurate scale.

Figures 1, 9:
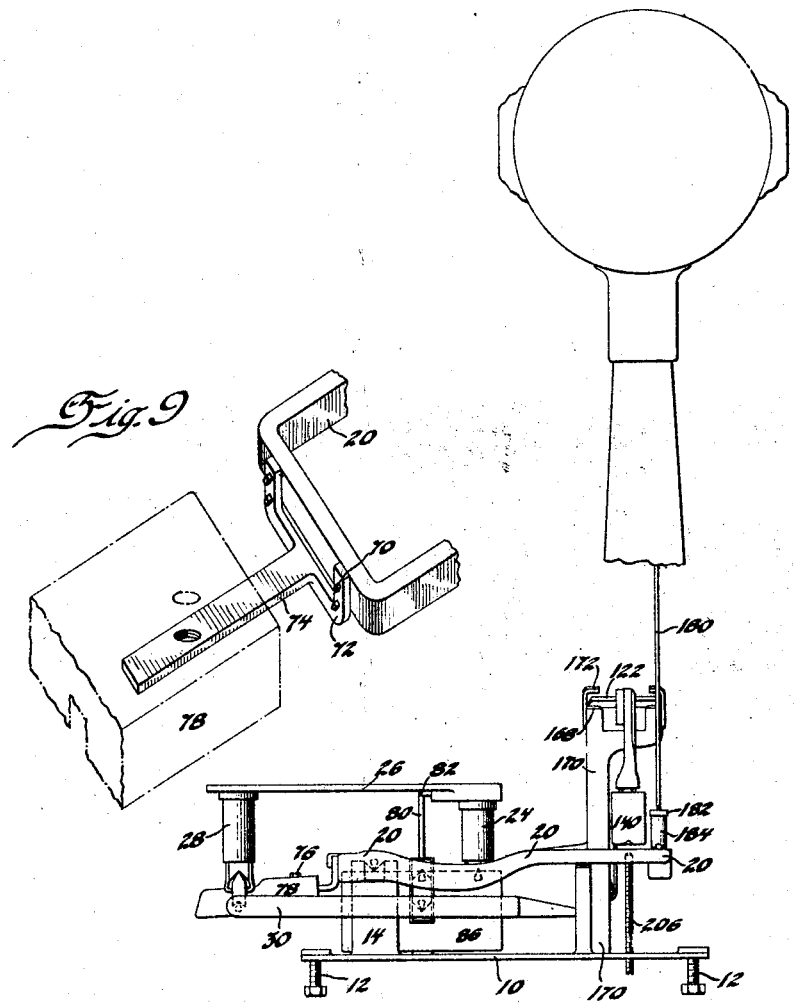
Fig. 9 is a perspective view showing the novel method of mounting the load counterweight on the main lever.
Figure 5:
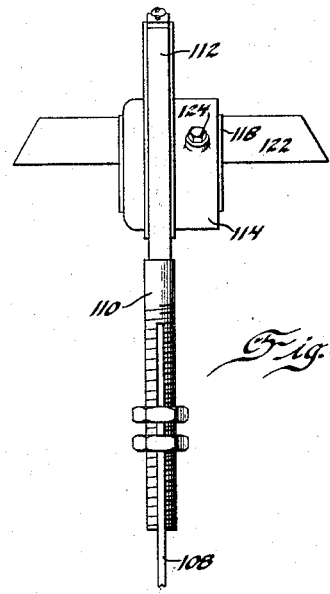
Fig. 5 is a section on the line 5—5 of Fig. 3.
Figure 7:
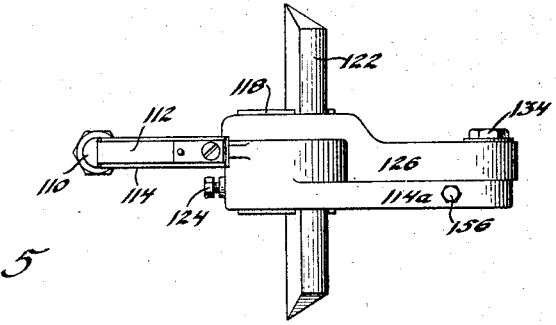
Fig. 7 is a view as if in the direction of the arrow 7 of Fig. 4.
Figure 6:
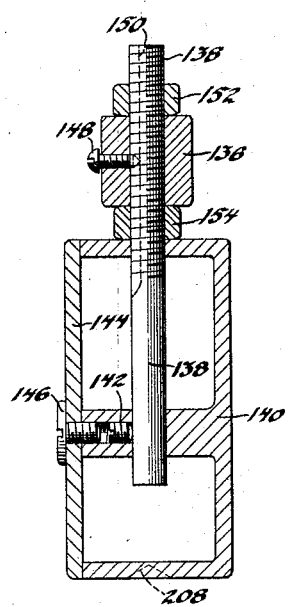
Fig. 6 is a section on the line 6—6 of Fig. 3.

The construction of the scale will be best observed from Figs. 1 and 2. Referring to these figures it will be seen that there is provided a scale base 10 to which may be connected a scale cover by the screws 12, the base having secured thereon the dashpot, described later. Projecting upwardly from the base 10 is a portion 14 having a bearing 16 in which rests the knife edge 18 secured to the main lever 20 (E), whereby the latter is connected to the base by the fixed pivot 16—18 (F). Secured at an intermediate point to the lever 20, by means of the knife edge and bearing construction indicated at 22, is a leg 24 (D) formed integral or at least operatively so, with the scale platform or load receiver 26 (A), the latter having another leg 28 (B) projecting downwardly therefrom and connected to the sub-lever 30 (C) by means of a floating pivot, which will be described in detail.

The main lever 20 and the sub-lever 30 are connected to each other by a link 32 (G) which is connected to the levers at the points 34 and 36, by suitable knife edge and bearing connections. The sub-lever 30 is also provided at one end with a fulcrum pin 38 which engages a bearing surface 40 (H) secured to a part 42 projecting upwardly from and integral with the base 10, the latter having a screw 44 which serves to limit the downward movement of the sub-lever 30, the upward movement of the latter being limited by the engagement of the fulcrum pin 38 with the bearing 40.

The connection between the leg 28 and the sub-lever 30 includes a bearing 50, scarfed at 52, in which is disposed the knife edge 54 of the member 56, the latter being scarfed at 58 to receive the knife edge 60 formed as part of the sub-lever 30, leg 28 being further provided with a pair of hooked members 62 which engage in a slot 64 in the member 56, whereby the latter is held in assembly with the leg 28, the member 56 thus providing a floating connection between the leg 28 and the sub-lever 30.

Secured to one end of the main lever by bolts 70 is a bracket 72 (Figs. 2 and 9) having an outwardly extending arm 74 to which may be secured, by means of the bolt 76, a counterweight 78 (K). This construction permits the separate manufacture of the main lever and the counterweight and permits replacement of an oversize or undersize counterweight by one that is properly sized.

The scale platform 26 is provided with a piston rod 80, pivotally connected thereto at the point 82, and provided with a piston 84 slidable in the oil filled dash pot 86, the piston having an opening at 88 thru which oil may flow from one side of the piston 84 to another, the effective area of the opening 88 being controlled by the spring valves 90—92 whereby control and adjustment of the speed and smoothness with which the dash pot operates may be readily effected.

A feature of the invention is the novel form of pendulum counterweight provided for the main lever 20 and this form will now be described.

Referring to Figs. 2 to 7, particularly, it will be seen that to the end of the main lever 20 is secured a strap 100 in which is threaded a bolt 102, the latter having a pointed end resting in the bearing stone 104 secured in the stirrup 106 attached to the end of the link 108 (L), the latter being connected with the slotted bolt member 110 which in turn is connected by means of the strap 112 to the power sector or cross bar 114 of the pendulum counterweight. The power sector or cross bar 114 of the pendulum counterweight has a central circular opening 116 in which is disposed a barrel 118, the latter having a kerf or slot 120 for receiving the knife edge 122, the barrel 118 being held in the opening 116 by the set screw 124.

Lying along side extended arm 114a of the cross bar is the portion 126 of the weight support 128, the portion 126 having an opening at 130 receiving the barrel 118 and having a slot at 132 thru which the bolt 134 is threaded into the portion 114a of the cross bar, the bolt 134 serving to hold the weight support 128 in adjusted position with respect to the cross bar. The lower end of the cross bar is inbent, as at 136 and is threaded to receive the bolt 138 extending upwardly from the weight 140 (M), the latter being held on the bolt 138 by the set screw 142 covered by the face plate 144 and the face plate holding screw 146. The portion 136 is further provided with a set screw 148 whereby the bolt 138 is held non-rotatable with respect to it, the bolt 138 being grooved at 150 for this purpose.

In order to vary the leverage distance of the weight 140, there are provided two separate and independent means, one of which includes the check nuts 152 and 154 threaded on the bolt 150, and the other of which includes the adjusting screws 156—158 threaded thru the cross bar 114 and abutting the projection 160 formed integral with the portion 126 and riding in the slot 162 in the cross bar.

It will be observed that movement of the check nuts 152—154 to vary the position of the weight will vary the distance between the center of the weight and the knife edge at 122, this adjustment being for the low and high points of the range or capacity of the scale, the intermediate point having, for their adjustment, the screws 156—158 which vary the position of the knife edge 122 with respect to the weight support.

It will be further observed that the axis of the bolt 138 is offset with respect to a line passing thru the point of the knife edge 122, a distance indicated on Fig. 4 as about ⅛ of an inch, this offset being effective in weight position adjustment.

The mounting of the pendulum counterweight is effected in the following manner: The knife edge 122 rests on bearings 168 (N) in the portion 170 projecting upwardly from and operatively integral with the base 10, the portion 170 being provided with hooked elements 172 which assist in retaining the knife edge, and with it the entire pendulum, in place on the bearings 168.

Figure 8:
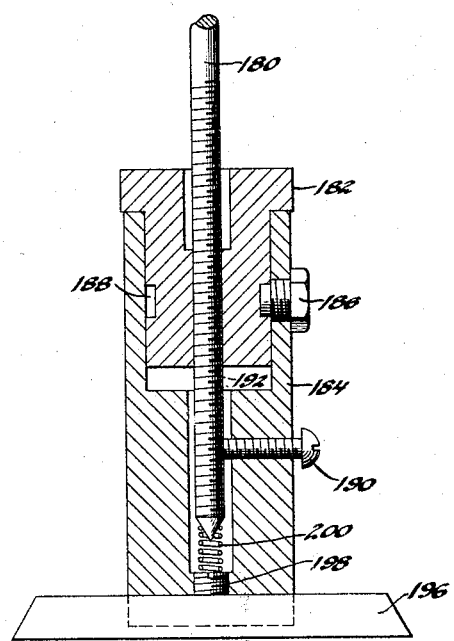
Fig. 8 shows the novel form of rack rod adjustment.
Figure 11:
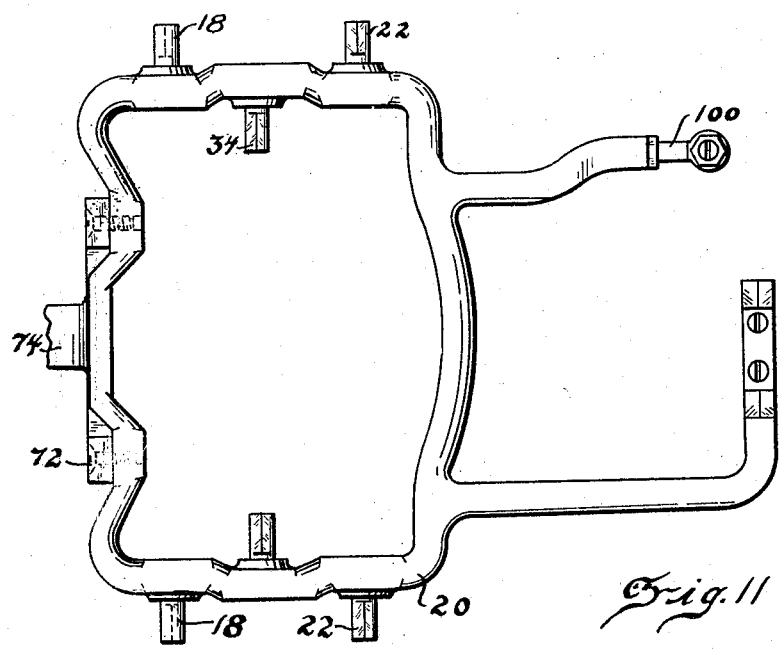
Figs. 11 and 12 are respectively a plan view and side elevation of the main lever.
Figure 12:
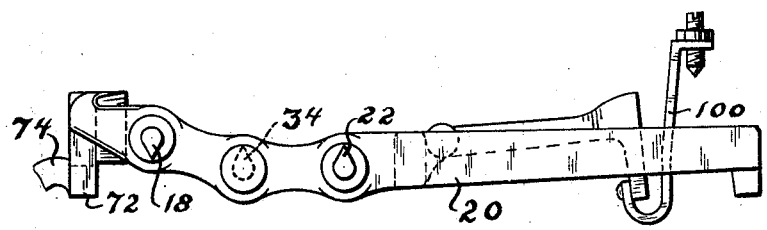

The construction thus far described includes all of the operative portions of a scale with the exception of the weight indicator and the latter will now be described:

Referring to Figs. 2 and 8, particularly, the main lever 20 has resting thereon the rack rod 180 (P), the latter being connected to a weight indicator R in a well known manner. Movement of the lever 20 downwardly, permits the rack rod to move downwardly a distance which reflects the weight placed on the platform, the distance being indicated by the indicator as will be understood.

In order to provide for adjusting the effective length of the rack rod, the latter is threaded at its lower end into a knurled collar 182, the collar being held against longitudinal movement in the sleeve 184 by the set screw 186 disposed within the peripheral groove 188 in the collar, rotation of the collar, however being permitted. The sleeve is further provided with a set screw 190 wh'ch engages the groove 192 in the rack rod so as to hold the latter against rotary motion, tho permitting longitudinal movement. It will be observed that rotation of the knurled collar 182 will cause longitudinal movement of the rack rod since the latter cannot rotate with the collar.

The lower end of the sleeve 184 is provided w'th a slot 194 in which the knife edge 196 is disposed, the portions on either side of the knife edge being swedged over to hold the latter in its place, there being a set screw 198 in the sleeve to force the knife edge further into the tapered walls of the slot and to hold it in place. A spring 200 is provided to hold the rack rod rigid, the spring cooperating with the collar 182 and the set screw 190 for this purpose.

Another feature of the invention is the means provided to lift the pendulum counterweight, as a unit, off the bearings 168 whereby jarring and vibration incidental to shipment of the scale will not cause the dulling of the knife edge, and such means includes a long screw bolt 206 threaded thru the base 10 and adapted to engage the countersink 208 in the weight 140 of the pendulum, whereby, when the screw 206 is rotated sufficiently it will engage and lift the weight off the bearings 168.

Now having described the invention and the preferred embodiment thereof, it is to be understood that the said invention is to be limited, not to the specific details herein set forth, but only by the scope of the claims which follow:—

1. A weighing scale including a load platform, a main lever pivotally connected at one end to the frame of the scale, pivotally connected at an intermediate point to a pendulum type counterweight, and operatively connected at its other end to an indicator, and a full floating sub-lever pivotally suspended from the main lever and partially supporting at one end the load platform the other end of said sub-lever being restrained from upward movement.

2. A weighing scale including a load platform, a main lever pivotally connected at one end to the frame of the scale, pivotally connected at an intermediate point thereof to the load platform, pivotally connected at another intermediate point to a pendulum type counterweight, and operatively connected at its other end to an indicator, and a full floating sub-lever pivotally suspended from the main lever and partially supporting at one end the load platform the other end of said sub-lever being restrained from upward movement, the scale base or frame being provided with means cooperating with a portion of said sub-lever to restrain full floating movement of the latter.

3. In combination with a weighing lever, a pendulum type counterweight including a cross bar pivotally mounted in a fixed portion of the scale frame, means connecting one end of the cross bar to the lever, a weight support connected to the other end of the cross bar, a weight carried by the free end of said weight support, means to move said cross bar with respect to the weight, and means to move the weight on its support towards and away from the pivotal mounting.

4. In combination with a weighing lever, a pendulum type counterweight including a cross bar pivotally mounted in the scale frame, means connecting one end of the cross bar to the lever, a weight support connected to the other end of the cross bar, a weight carried by the free end of said weight support, means to move said cross bar with respect to the weight, and means independent of said last mentioned means to move the weight on its support towards and away from the pivotal mounting.

5. Means for adjusting the effective length of a scale rack rod having a threaded end, comprising a collar threaded onto said end, a sleeve having a counterbore receiving said collar, a screw threaded into said sleeve and engaging said collar to prevent longitudinal movement thereof but permitting rotary movement thereof, and a second screw threaded into said sleeve and engaging said rod to prevent rotary movement thereof but permitting longitudinal movement thereof, said sleeve being provided with a knife edge in the end thereof opposite its counterbored end.

6. Means for adjusting the effective length of a scale rack rod having a threaded end, comprising a collar threaded onto said end, a sleeve having a counterbore receiving said collar, a screw threaded into said sleeve and engaging said collar to prevent longitudinal movement thereof but permitting rotary movement thereof, and a second screw threaded into said sleeve and engaging said rod to prevent rotary movement thereof but permitting longitudinal movement thereof, said sleeve being provided with a knife edge in the end thereof opposite its counterbored end, and a spring in said sleeve upon which rests an end of said rod.

7. A flexible connection between a horizontally disposed weighing lever and a vertically disposed link, including a stirrup secured to the end of said link, a bearing member in said stirrup, a strap secured to said lever, and having an end disposed in said stirrup above said bearing surface, and a bolt threaded into said strap end and resting on said bearing surface, the connection as a whole being such that downward movement of said lever causes downward movement of said link, whereas upward movement of said lever does not cause upward movement of said link, the latter then being left free to move of its own accord.

8. A flexible connection between two scale parts one of which may be a horizontally disposed weighing lever and the other of which may be a vertically disposed link, said connection including a stirrup secured to the end of said link, a bearing member in said stirrup, a strap secured to said lever, and having an end disposed in said stirrup above said bearing surface, and a bolt threaded into said strap end and resting on said bearing surface, the connection as a whole, being such that downward movement of said lever causes downward movement of said link, whereas upward movement of said lever does not cause upward movement of said link, the latter then being left free to move of its own accord.

9. A flexible connection between two scale parts, one of which may be a horizontally disposed weighing lever and the other of which may be a vertically disposed link, said connection including a stirrup secured to the end of said link, a bearing member in said stirrup, a strap secured to said lever, and having an end disposed in said stirrup above said bearing surface, and means forming part of said strap end and resting on said bearing surface, the connection as a whole, being such that downward movement of said lever causes downward movement of said link whereas upward movement of said lever does not cause upward movement of said link, the latter then being left free to move of its own accord.

10. In a scale, a weighing lever having a bracket secured thereto and having an arm aligned with said lever, and a counterweight removably secured to said bracket in such a manner as to become an operatively integral part of said lever, said counterweight being so disposed as to form a continuation of said lever.

11. In a scale, a weighing lever having a bracket secured thereto and having an arm aligned with said lever, and a counterweight bolted to said bracket in such a manner as to become an operatively integral part of said lever, said counterweight being so disposed as to form a continuation of said lever.

12. In combination, a scale platform, a weighing lever and a floating connection between them, the latter including a portion substantially integral with said platform and projecting downwardly, and having a scarfed knife edge receiving bearing on its lower end, a knife edge on said lever, and a member having a knife edge on its upper end disposed in said scarfed bearing and being scarfed on its lower end to receive the lever knife edge.

13. In combination, a scale platform, a weighing lever and a floating connection between them, the latter including a portion substantially integral with said platform and projecting downwardly, and having a scarfed knife edge receiving bearing on its lower end, a knife edge on said lever, and a member having a knife edge on its upper end disposed in said scarfed bearing scarfed on its lower end to receive the lever knife edge, and means to hold said member in assembly.

14. In combination, a scale platform, a weighing lever and a floating connection between them, the latter including a portion substantially integral with said platform and projecting downwardly, and having a scarfed knife edge receiving bearing on its lower end, a knife edge on said lever, and a member having a knife edge on its upper end disposed in said scarfed bearing and scarfed on its lower end to receive the lever knife edge, and means to hold said member in assembly with said platform portion and bearing.

15. In combination, a scale platform, a weighing lever and a floating connection between them, the latter including a portion substantially integral with said platform and projecting downwardly and having a scarfed knife edge receiving bearing on its lower end, a knife edge on said lever, and a member having a knife edge on its upper end disposed in said scarfed bearing and being scarfed on its lower end to receive the lever knife edge, and means to hold said member in assembly with said platform portion and bearing, said means comprising hook portions projecting from said platform portion and engaging said member to hold it in place.

16. In combination, a scale platform, a weighing lever and a floating connection between them, the latter including a portion substantially integral with said platform and projecting downwardly, and having a bearing on its lower end, a pivot on said lever, and a member having a pivot on its upper end disposed in said bearing, and having its lower end resting on the lever pivot.

LEONARD O. KELLEY.